(12) United States Patent
Liang et al.

(10) Patent No.: US 11,105,971 B2
(45) Date of Patent: Aug. 31, 2021

(54) LIGHT GUIDE ASSEMBLY, METHOD FOR MANUFACTURING THE SAME, AND TOTAL REFLECTIVE DISPLAY DEVICE

(71) Applicants: BOE Technology Group Co., Ltd., Beijing (CN); Beijing BOE Optoelectronics Technology Co., Ltd., Beijing (CN)

(72) Inventors: Fei Liang, Beijing (CN); Jingjun Du, Beijing (CN); Zheng Wang, Beijing (CN); Tingxiu Hou, Beijing (CN); Xiuyun Chen, Beijing (CN); Lingyu Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 16/195,112

(22) Filed: Nov. 19, 2018

(65) Prior Publication Data

US 2019/0331845 A1  Oct. 31, 2019

(30) Foreign Application Priority Data

Apr. 28, 2018 (CN) .......................... 201810407247.3

(51) Int. Cl.
*H01J 1/63* (2006.01)
*F21V 8/00* (2006.01)

(52) U.S. Cl.
CPC .......... *G02B 6/0065* (2013.01); *G02B 6/0041* (2013.01)

(58) Field of Classification Search
CPC ................ G02B 6/0041; G02B 6/0036; G02B 6/0053; G02B 6/0043
See application file for complete search history.

(56) References Cited

U.S. PATENT DOCUMENTS

| 6,411,439 | B2 * | 6/2002 | Nishikawa | G02B 3/0031 |
| | | | | 359/455 |
| 6,597,509 | B2 * | 7/2003 | Takakuwa | G02B 3/0031 |
| | | | | 356/401 |

(Continued)

*Primary Examiner* — Andrew J Coughlin
(74) *Attorney, Agent, or Firm* — Westman, Champlin & Koehler, P.A.

(57) ABSTRACT

A light guide assembly, a total reflective display device and a method for manufacturing a light guide assembly are provided in the embodiments of the disclosure, the light guide assembly including: a first transparent adhesion layer, having a first profile formed thereon; a second transparent adhesion layer adhered to the first transparent adhesion layer and formed with a second profile corresponding to the first profile on a side of the second transparent adhesion layer adhered to the first transparent adhesion layer, the first profile and the second profile being formed to be in positive fit with each other and configured to incur light refraction at an interface therebetween of light rays being incident upon the first transparent adhesion layer from the second transparent adhesion layer to decrease an incident angle of the light rays; and a light guide panel, arranged on a side of the second transparent adhesion layer facing away from the first transparent adhesion layer.

15 Claims, 5 Drawing Sheets

(56) References Cited

U.S. PATENT DOCUMENTS

| | | | |
|---|---|---|---|
| 2006/0109681 A1* | 5/2006 | Kim | G02B 6/0041 362/606 |
| 2011/0063873 A1* | 3/2011 | Parker | G02B 6/0036 362/609 |
| 2012/0043881 A1* | 2/2012 | Kuroda | G02B 5/045 313/504 |
| 2016/0291238 A1* | 10/2016 | Tai | G02B 6/0043 |

* cited by examiner

LIGHT GUIDE ASSEMBLY, METHOD FOR MANUFACTURING THE SAME, AND TOTAL REFLECTIVE DISPLAY DEVICE

CROSS-REFERENCE TO RELATED INVENTION

The present disclosure claims the benefit of Chinese Patent Application Invention No. 201810407247.3 filed on Apr. 28, 2018 in the China National Intellectual Property Administration, the whole disclosure of which is incorporated herein by reference.

BACKGROUND OF THE DISCLOSURE

Field of the Disclosure

Embodiments of the present disclosure relate to the technical field of display technologies, and especially to a light guide assembly, a method for manufacturing the same, and a total reflective display device.

Description of the Related Art

With the popularization of portable electronic devices such as smartphones, tablet computers and the like, requirements on lower power consumption and extra-long standby time and the like of display assemblies applied on these portable electronic devices respectively may become even higher and higher. Therefore, a total reflective display is provided, which may provide an image display by utilizing reflected ambient light in a condition of sufficient ambient light, without lighting up its own light source (e.g., backlight thereof), so as to decrease power consumption significantly and extend/prolong the standby time.

SUMMARY OF THE DISCLOSURE

The embodiments of the present disclosure have been made to overcome or alleviate at least one aspect of the above-mentioned disadvantages and/or shortcomings in the prior art, by providing a light guide assembly, a method for manufacturing the same, and a total reflective display device.

Following technical solutions are adopted in exemplary embodiments of the invention for achieving the above desired technical purposes.

According to an aspect of the exemplary embodiment of the present disclosure, there is provided a light guide assembly, comprising: a first transparent adhesion layer, having a first profile formed thereon; a second transparent adhesion layer adhered to the first transparent adhesion layer and formed with a second profile corresponding to the first profile on a side of the second transparent adhesion layer adhered to the first transparent adhesion layer, the first profile and the second profile being formed to be in positive fit with each other and configured to incur light refraction at an interface therebetween of light rays being incident upon the first transparent adhesion layer from the second transparent adhesion layer to decrease an incident angle of the light rays; and a light guide panel, arranged on a side of the second transparent adhesion layer facing away from the first transparent adhesion layer.

According to an embodiment of the disclosure, the light guide assembly further comprises: a third transparent adhesion layer, arranged between the second transparent adhesion layer and the light guide panel, and configured to fix the second transparent adhesion layer relative to the light guide panel by adhesion.

According to an embodiment of the disclosure, at least one of the first profile and the second profile has an arrangement pattern in which a plurality of sub-patterns are arranged, comprising one of the following: a honeycomb-shaped pattern, a matrix pattern comprising a plurality of columns functioning as the plurality of sub-patterns; and a herringbone pattern.

According to an embodiment of the disclosure, in the arrangement pattern of at least one of the first profile and the second profile, the plurality of sub-patterns are set as following: each of the plurality of sub-patterns in the honeycomb-shaped pattern is in a form of round shape, with a diameter ranging between 10 µm and 30 µm, and a fluctuation level ranging between 3 µm and 10 µm.

According to an embodiment of the disclosure, in the arrangement pattern of at least one of the first profile and the second profile, the plurality of sub-patterns are set as following: each of the plurality of sub-patterns in the matrix pattern comprising a plurality of columns is in a form of rectangular shape, with a length ranging between 10 µm and 30 µm, a width ranging between 3 µm and 5 µm, and a fluctuation level ranging between 3 µm and 10 µm.

According to an embodiment of the disclosure, in the arrangement pattern of at least one of the first profile and the second profile, the plurality of sub-patterns are set as following: each of the plurality of sub-patterns in the herringbone pattern is in a form of rectangular shape, with a length ranging between 10 µm and 30 µm, a width ranging between 3 µm and 5 µm, an inclination angle relative to a lengthwise direction in which the light guide assembly extends being 15°~60°, and a fluctuation level ranging between 3 µm and 10 µm.

According to an embodiment of the disclosure, in the arrangement pattern of at least one of the first profile and the second profile, a density of the plurality of sub-patterns becomes larger as a distance between each of the plurality of sub-patterns and a light incidence side increases.

According to an embodiment of the disclosure, a refractive index of the first transparent adhesion layer is smaller than a refractive index of the second transparent adhesion layer.

According to an embodiment of the disclosure, the refractive index of the first transparent adhesion layer ranges between 1.4 and 1.54, and the refractive index of the second transparent adhesion layer ranges between 1.58 and 1.8.

According to an embodiment of the disclosure, a refractive index of the third transparent adhesion layer ranges between 1.58 and 1.8.

According to another aspect of the exemplary embodiment of the present disclosure, there is provided a total reflective display device, comprising: the light guide assembly as above; a total reflective display assembly on a side of the light guide assembly facing away from a display face; and a light source, which is provided on a lateral side surface of the light guide assembly and configured to emit light incident inwards a light guide panel from a lateral side surface of the light guide pane within the light guide assembly transversely.

According to still another aspect of the exemplary embodiment of the present disclosure, there is provided a method for manufacturing a light guide assembly, comprising: forming a first transparent adhesion layer on a substrate; forming a first profile on the first transparent adhesion layer with a mould; forming a second transparent adhesion layer having a second profile corresponding to the first profile, on the first transparent adhesion layer formed with the first profile, the first profile and the second profile being formed to be in positive fit with each other and configured to incur light refraction at an interface therebetween of light rays being incident upon the first transparent adhesion layer from the second transparent adhesion layer to decrease an incident angle of the light rays; and arranging a light guide panel on a side of the second transparent adhesion layer facing away from the first transparent adhesion layer.

According to an embodiment of the disclosure, the method further comprises: forming a third transparent adhesion layer between the second transparent adhesion layer and the light guide panel to fix the second transparent adhesion layer relative to the light guide panel by adhesion.

According to an embodiment of the disclosure, after the step of arranging the light guide panel on the side of the second transparent adhesion layer facing away from the first transparent adhesion layer, the method further comprises: removing the substrate from the light guide assembly; and adhering the light guide assembly having the substrate removed already to a total reflective display assembly to form a total reflective display device.

According to an embodiment of the disclosure, the method further comprises: disposing a light source on a side of the light guide assembly to enable the light source to selectively emit light toward a side of the light guide panel in the light guide assembly.

According to an embodiment of the disclosure, once one or more of the first transparent adhesion layer, the second transparent adhesion layer and the third transparent adhesion layer are formed, the method further comprises: pre-curing one or more of the first transparent adhesion layer, the second transparent adhesion layer and the third transparent adhesion layer, to fix their relative positions thereamong.

According to an embodiment of the disclosure, the step of forming the first profile on the first transparent adhesion layer with a mould comprises: pressing the first transparent adhesion layer which has been pre-cured to form the first profile which is recessed inwards the first transparent adhesion layer, on the first transparent adhesion layer, by pressing the mould against the first transparent adhesion layer in a direction facing towards the substrate.

According to an embodiment of the disclosure, the step of forming the second transparent adhesion layer having the second profile corresponding to the first profile on the first transparent adhesion layer formed with the first profile comprises: forming the second transparent adhesion layer having the second profile projecting towards the first profile by applying a liquid transparent adhesive material on a side of the first transparent adhesion layer facing away from the substrate and being formed with the first profile which is recessed inwards the first transparent adhesion layer, the second profile being in positive fit with the first profile.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE DISCLOSURE

Figure 1:
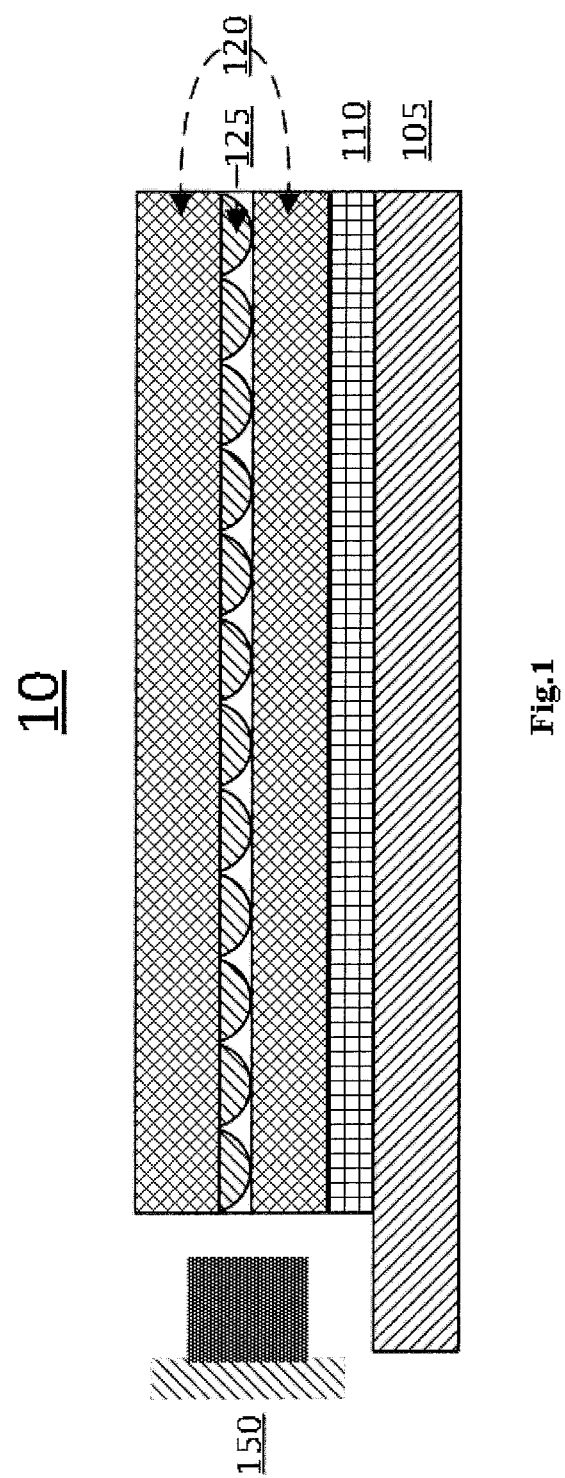
FIG. 1 illustrates a schematic structural view of a front light guide assembly in the relevant art.

A portion of embodiments of the disclosure are depicted in detail hereinafter with reference to drawings, with unnecessary details and functionalities as to the disclosure being omitted during the depiction so as to prevent any confusion in understanding of the embodiments of the disclosure. In the specification, various embodiments for depicting principles of the disclosure are merely intending to be illustrative, rather than being interpreted to be any restriction on scope of the disclosure in any way. Following depictions with reference to the drawings are used to obtain a comprehensive understanding of exemplary embodiments of the disclosure defined by claims and any equivalent thereof. Following depictions contain various specific details to assist in understanding, however, such details should be considered to be merely exemplary. Therefore, it may be known by those skilled in the art that, various modifications and alterations may be made to the embodiments of the disclosure as depicted. In addition, for clarity and conciseness, depictions concerning commonly known functionalities and structures may be omitted. Moreover, identical reference signs/numerals are used for indicating same or similar functionalities, devices and/or operations, throughout the drawings. Furthermore, in the drawings, various components may not necessarily be drawn to scale. In other words, relative sizes, lengths of various components in the drawings may not necessarily be drawn corresponding to practical scales.

In the disclosure, terminologies "comprising/comprise(s)" and "including/include(s)" and any derivative thereof have a meaning of "inclusive" rather than restrictive; and a terminology "or" also means "inclusive", i.e., and/or. In addition, in following depictions of the disclosure, terms concerning direction/orientation such as "upper", "lower", "left", and "right" and the like are used to refer to relative positional relationship, so as to assist in understanding embodiments of the disclosure by those skilled in the art. And it should be understood by those skilled in the art that, "upper"/"lower" in one direction may become "lower"/"upper" in an opposite direction, and may become other positional relationship in another direction, e.g., "left"/"right" and the like.

As depicted hereinafter, an application of embodiments of the disclosure in a total reflective display device is exemplified to provide a depiction in detail. However, it should be understood by those skilled in the art that specific application fields of embodiments of the disclosure may not be limited thereto. In fact, a light guide assembly and a method for manufacturing the same, and the like, may be applied to other technical fields using the light guide assembly, e.g., it may function as a backlight light guide assembly.

However, as to a total reflective display device, it may has a degraded display effect in a condition of a weak ambient light (e.g., in a night environment, an indoor environment and the like) due to decreased amount of light rays incident into the display assembly, as compared to a display effect in a condition of sufficient ambient light. In order to solve such a problem, the total reflective display device may typically be provided with an additional front optical system, which may implement a purpose of enhancing display effect by turning on a light source in a condition of relatively weak ambient light.

In a design of a relevant total reflective display device, a design way in which a front (i.e., located on a side of the display assembly facing towards a user thereof) light guide panel (which may also be referred to as Light Guide Panel, i.e., abbreviated as LGP) is adhered to a reflective display assembly by an optical clear adhesive (sometimes being abbreviated as OCA hereinafter) may typically be used. However, in such a design, the adhesion by OCA may affect seriously a regulating effect on angles of light rays implemented with a mesh grid dot matrix or point lattice in the LGP, decreasing the amount of light rays being incident into the display assembly, and in turn influencing the display effect. In addition, such a design may also result in a relatively shortened distance for mixing light rays emitted by the light source, which fact may also decrease the amount of light rays being incident into the display assembly, and a degraded overall display effect.

FIG. 1 illustrates a schematic structural view of a front light guide assembly 10 in the relevant art, the front light guide assembly being provided on a side of a display assembly (e.g., a total reflective display assembly 105 as illustrated) facing towards a user. As illustrated in FIG. 1, the front light guide assembly 10 for example comprises a light guide panel 120 and a transparent adhesion layer (e.g., OCA) 110. The front light guide assembly 10 may for example be fixed to the total reflective display assembly 105 by a secured adhesion by the transparent adhesion layer 110 contained therein, as illustrated. Furthermore, a light source 150 (e.g., in some embodiments, a light-emitting diode (LED) light source) is further provided on a lateral side of the light guide panel 120 of the front light guide assembly 10 (e.g., on a side surface of the light guide panel 120 in a direction perpendicular to a longitudinal direction along which the light guide panel 120 extends; i.e., a transverse side), such that the light source 150 may be turned on to function as a supplementary light source which provides a supplementary illumination for the total reflective display assembly 105 in a condition that ambient light is insufficient.

In a condition of sufficient ambient light, e.g., during the daytime which has sufficient sunshine hours, the light source 150 may not be turned on; and in such a condition, the ambient light may pass through the light guide panel 120 and the transparent adhesion layer 110 and then be incident onto the total reflective display assembly 105, such that the total reflective display assembly 105 may operate properly. In a condition of insufficient ambient light, e.g., during the night dimly lit, then the light source 150 may be turned on; and in such a condition, light rays (referred to as "supplementary light rays") originating from the light source 150 which functions as the supplementary light source may be incident onto the light guide panel 120 through a lateral side of the light guide panel 120, and may in turn be scattered at a mesh grid dot matrix 125 interposed within the light guide panel 120 (e.g., several micro-scattering portions projecting towards a lower surface of the light guide panel 120, i.e., towards the total reflective display assembly 105, as illustrated). As such, the supplementary light rays may then for example be incident onto the total reflective display assembly 105 from the lower surface of the light guide panel 120 through the transparent adhesion layer 110, also facilitating a proper operation of the total reflective display assembly 105 just as if it works in a condition of sufficient ambient light.

However, as stated above, the adhesion implemented with the transparent adhesion layer 110 may affect seriously a regulating effect on angles of light rays implemented with the mesh grid dot matrix 125 in the light guide panel 120, decreasing the amount of light rays being incident into the total reflective display assembly 105. In addition, such a design may also shorten a distance for mixing light rays emitted by the light source 150, such that there may be an effect of light and shade with non-uniform luminance (uneven brightness) distribution at a side of the display assembly 105 next to the LED.

In order to at least overcome or alleviate aforementioned problems, a design of a light guide assembly is provided in embodiments of the disclosure. Generally, the light guide assembly may for example adopts a configuration having a light guide panel and two or three layers of optical adhesive (or more generally, a transparent adhesion layer). In some embodiments, a first layer of optical adhesive and a second layer of optical adhesive which are necessary may for example function to form specific profiles respectively for changing angles of incident light rays and increasing amount of incident light; moreover, an additional unnecessary/non-essential third layer of optical adhesive may for example function to ensure that there is no air bubble existing on a contact surface thereof with the light guide panel, and in turn to further improve optical properties of the light guide assembly.

Then, it is depicted in detail hereinafter how to manufacture the light guide assembly, in view of FIGS. 2A to 2F.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings re only intended to exemplarily illustrate the contents of the disclosure, rather than to demonstrate the practical dimension or proportion of components of a light guide assembly, and a total reflective display device.

According to a general technical concept of embodiments of the present disclosure, in an aspect thereof, a light guide assembly is provided, comprising: a first transparent adhesion layer, having a first profile formed thereon; a second transparent adhesion layer adhered to the first transparent adhesion layer and formed with a second profile corresponding to the first profile on a side of the second transparent adhesion layer adhered to the first transparent adhesion layer, the first profile and the second profile being formed to be in positive fit with each other and configured to incur light refraction at an interface therebetween of light rays being incident upon the first transparent adhesion layer from the second transparent adhesion layer to decrease an incident angle of the light rays; and a light guide panel, arranged on a side of the second transparent adhesion layer facing away from the first transparent adhesion layer.

Figure 2A:
FIGS. 2A to 2F illustrate schematic structural views at various stages of processes of manufacturing a light guide assembly according to an embodiment of the disclosure.
Figure 2B:
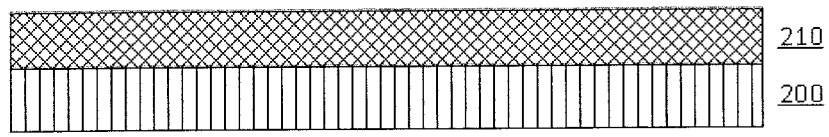
Figure 2C:
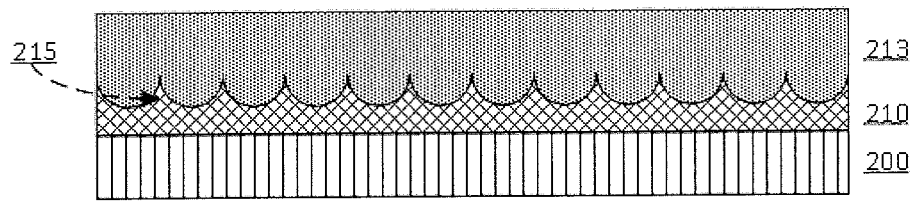
Figure 2D:
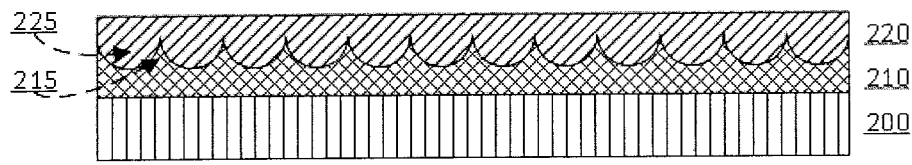
Figure 2E:
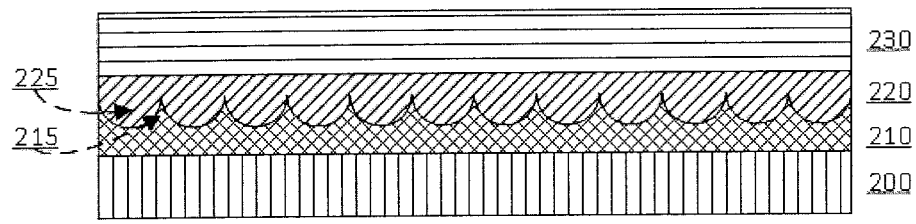
Figure 2F:
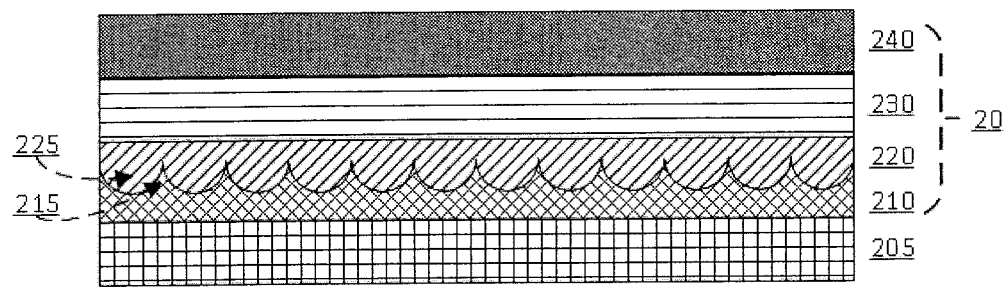

FIGS. 2A to 2F illustrate schematic structural views at various stages of processes of manufacturing a light guide assembly 20 according to an embodiment of the disclosure. The processes for preparing the light guide assembly 20 may start from FIG. 2A. As illustrated in FIG. 2A, before formal preparation of the light guide assembly 20 which functions as a final product as illustrated in FIG. 2F, a substrate 200 which functions as a working surface or a supporting surface for preparing the light guide assembly 20 may be prepared and pre-processed above all, e.g., the substrate 200 may be subject to processes such as smoothing/polishing, rinsing, drying or baking, and the like once it was prepared, so as to ensure a successful and smooth progress of subsequent processes.

By way of example, in one condition that the light guide assembly 20 is for example a light guide assembly 20 which is produced individually/separately (e.g., a light guide assembly 20 which is produced by a sole third-party manufacturer/vendor for a manufacturer of a total reflective display device), or in another condition that manufacturing processes for the light guide assembly 20 may exert an adverse influence (e.g., high temperature, high pressure, and the like) on a pre-produced total reflective display assembly 205 as illustrated in FIG. 2F to which the light guide assembly 20 is to be attached/adhered, it is required to prepare the light guide assembly 20 on the substrate 200 different from the total reflective display assembly 205, and then to bind the light guide assembly 20 to the total reflective display assembly 205 in subsequent manufacturing processes. However, embodiments of the disclosure may not be limited thereto. In fact, in an alternative embodiment, the light guide assembly 20 may for example be prepared directly on the total reflective display assembly 205. In such a condition, the total reflective display assembly 205 is considered to be equivalent to the substrate 200.

In addition, in some embodiments, the substrate 200 may for example be a rigid substrate. In some other embodiments, a material of the substrate 200 may for example be a material having a relatively fine light transmittance and a relatively high flatness, such as polycarbonate (i.e., PC) and acrylic (i.e., PMMA), and the like.

Then, as illustrated in FIG. 2B, e.g., a first transparent adhesion layer 210 is formed on the substrate 200. In some embodiments, the first transparent adhesion layer 210 may for example be formed by an optical clear adhesive (OCA), i.e., a transparent optical adhesive. The first transparent adhesion layer 210 may for example has a relatively lower refractive index as compared with other transparent adhesion layer(s) (e.g., a second transparent adhesion layer 220 and/or a third transparent adhesion layer 230 in the final product as illustrated in FIG. 2F, and the like). In an embodiment in which the first transparent adhesion layer 210 is OCA, by way of example, a liquid OCA is utilized, and then is for example applied onto the substrate 200, by vacuum attachment, spin coating and any other proper ways. Once the liquid OCA is applied, it may then be subject to pre-curing. The pre-curing may for example be an ultraviolet irradiation in a short time period (e.g., lasting merely several seconds). By the pre-curing, the liquid OCA material of the first transparent adhesion layer 210 is for example substantially fixed relative to the substrate 200, still reserves sufficient stickiness thereof, and may be transformed when a certain pressure is applied thereto so as to form various structures as desired.

Figure 4A:
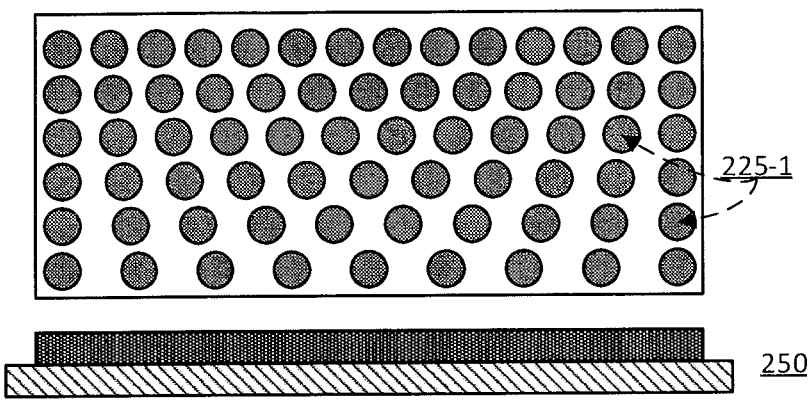
FIGS. 4A to 4C illustrate schematically top views of arrangement patterns of profiles adopted in light guide assemblies according to different embodiments of the disclosure.
Figure 4B:
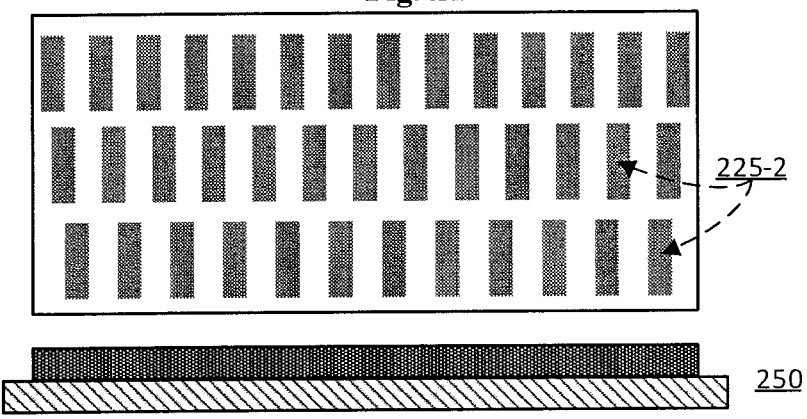
Figure 4C:
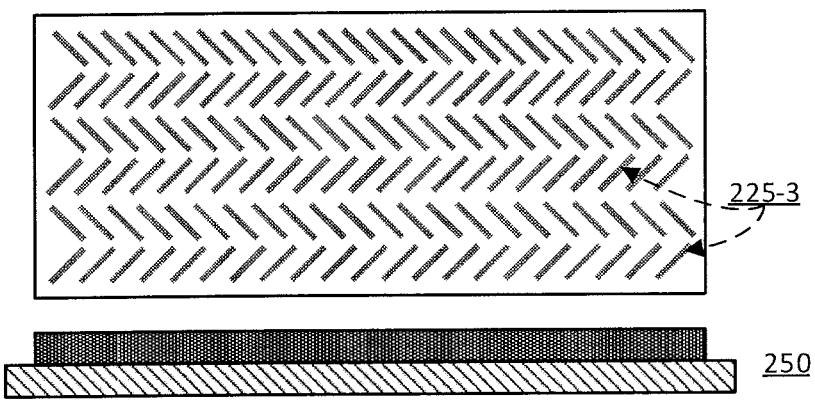

Next, as illustrated in FIG. 2C, by way of example, the first transparent adhesion layer 210 is pressed so as to form a first profile 215 on the first transparent adhesion layer 210 as desired, by pressing a mould 213 against the first transparent adhesion layer 210 (i.e., an upper surface thereof as illustrated) in a direction facing towards the substrate 200. More specifically, in some embodiments, the first transparent adhesion layer 210 which is pre-cured may be pressed against by a rigid mould 213, so as to form the first profile 215 on the first transparent adhesion layer 210. By way of example, as illustrated in FIG. 2C, the first profile 215 is formed to be recessed inwards the first transparent adhesion layer. However, embodiments of the disclosure may not be limited thereto, and the first profile 215 may be formed to have other distribution densities of its sub-patterns, shapes, and/or dimensions. By way of example, as illustrated in FIGS. 4A to 4C, the first profile 215 may also be formed for example in a form of a matrix shaped pattern comprising a plurality of columns, in a form of a herringbone pattern, and the like. Furthermore, as far as the material of the mould is concerned, in some embodiments, the mould 213 may for example be a rigid mould formed by a metallic material (such as copper, nickel, and the like).

Subsequently, as illustrated in FIG. 2D, the second transparent adhesion layer 220 may be formed on a side of the first transparent adhesion layer 210 (which has the first profile 215) facing away from the substrate 200, such that the second transparent adhesion layer 220 has a second profile 225 corresponding to (e.g., in positive fit with) the first profile 215. More specifically, in some embodiments, the first transparent adhesion layer 210 which has been pre-cured may be applied with a liquid optical clear adhesive, and the liquid optical clear adhesive may then fill up the interior of the first profile 215 which is recessed inwards in the direction facing towards the substrate as illustrated in FIG. 2C, so as to form on the first transparent adhesion layer 210 the second transparent adhesion layer 220 having the second profile 225 which projects inwards the first profile 215. The second transparent adhesion layer 220 may for example have a higher refractive index as compared with that of the first transparent adhesion layer 210. In some embodiments, the refractive index of the first transparent adhesion layer 210 may for example range between 1.4 and 1.54, and the refractive index of the second transparent adhesion layer 220 may for example range between 1.58 and 1.8; however, embodiments of the disclosure may not be limited thereto. In addition, in a condition that the second transparent adhesion layer 220 is formed by liquid OCA, it may be pre-cured in a way similar to the first transparent adhesion layer so as to be substantially fixed relative to the first transparent adhesion layer 210, still reserving its stickiness.

After that, as illustrated in FIG. 2E, by way of example, a third transparent adhesion layer 230 is additionally formed on a side of the second transparent adhesion layer 220 without the second profile (i.e., a side of the second transparent adhesion layer 220 opposite to the side having the second profile; in other words, a side of the second transparent adhesion layer 220 facing away from the first transparent adhesion layer 210). More specifically, in some embodiments, the third transparent adhesion layer 230 which is unnecessary may be provided additionally as desired, and is mainly configured to facilitate a perfect adhesion thereafter implemented between the second transparent adhesion layer 220 and the light guide panel 240 to be attached thereto, with bubbles being as little as possible or even without any bubble between the second transparent adhesion layer 220 and the light guide panel 240, so as to improve display quality. Similarly, e.g., a material of the third transparent adhesion layer 230 may further be pre-cured, for example by an ultraviolet irradiation in a short time period (e.g., lasting merely several seconds). In addition, in some embodiments, the third transparent adhesion layer 230 may for example have a relatively higher refractive index as compared with that of the first transparent adhesion layer. More specifically, by way of example, in some embodiments, the third transparent adhesion layer 230 may for example be similar to the second transparent adhesion layer 220 in this connection (i.e., as to the issue of refractive index), with a refractive index for example ranging between 1.58 and 1.8.

Afterwards, as illustrated in FIG. 2F, the light guide panel 240 may be adhered to the third transparent adhesion layer 230, or be adhered directly to the second transparent adhesion layer 220 (e.g., in a condition that there exists no third transparent adhesion layer 230 between the light guide panel 240 and the second transparent adhesion layer 220, or in another condition that the third transparent adhesion layer is at least partially missing/absent between the light guide panel 240 and the second transparent adhesion layer 220 (i.e., there is at least one interface at which the light guide panel 240 and the second transparent adhesion layer 220 are in direct contact with each other)), such that the light guide plate 240 is relatively fixed relative to the other layers, thereby forming the light guide assembly 20, and the light guide module 20 includes the first transparent adhesive layer 210, the second transparent adhesive layer 220 and the light guide panel 240 arranged in a stack, and for example, additionally includes the third transparent adhesive layer 230 interposed between the second transparent adhesive layer 220 and the light guide panel 240. Then, in some embodiments, in a condition that the light guide assembly 20 and the total reflective display assembly 205 are manufactured respectively, e.g., the substrate 200 is peeled away from a bottom of the light guide assembly 20, and the light guide assembly 20 with the substrate 200 being removed therefrom already is subsequently adhered to the total reflective display assembly 205. After all these transparent adhesion layers are sequentially adhered to the light guide panel 240 so as to form the light guide assembly 20 and the light guide assembly 20 is in turn adhered to the total reflective display assembly 205, all these transparent adhesion layers may be cured (e.g., by an ultraviolet irradiation in a short time period (e.g., lasting merely several minutes)) so as to implement a production of the total reflective display device as a final product.

It should be noticed that, specific adhesion processes in above procedures for preparing the light guide assembly 20 may for example be any appropriate adhesion process in relevant at or will be developed in the near future, without being depicted in detail in embodiments of the disclosure.

Figure 3A:
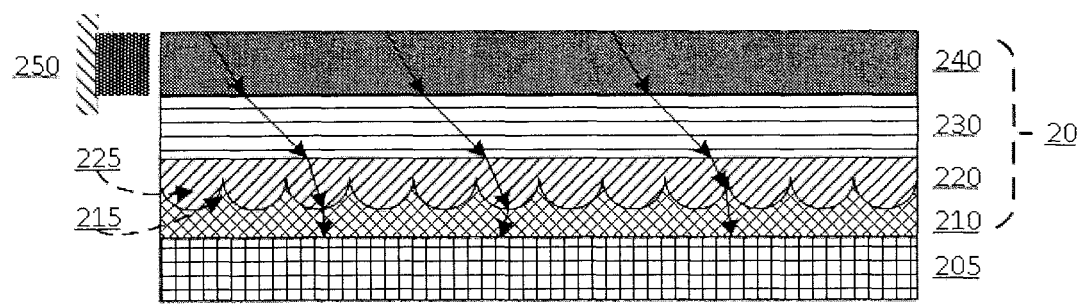
FIGS. 3A and 3B illustrate schematic structural views of a total reflective display device using the light guide assembly as illustrated in FIG. 2, each being illustrated with a portion of light paths in case the light source is turned on and turned off, respectively.
Figure 3B:
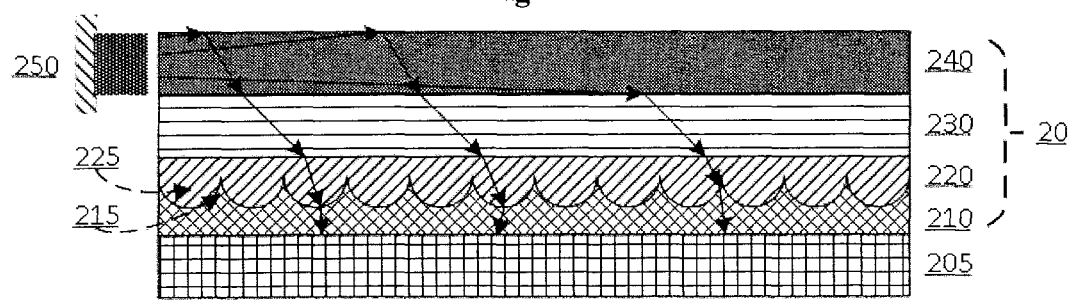

After the manufacturing processes as illustrated in FIGS. 2A to 2F, the total reflective display device as illustrated in FIG. 3A and FIG. 3B may be obtained. Next, it may be depicted in detail in view of FIG. 3A and FIG. 3B how the light guide assembly 20 as illustrated in embodiments of the disclosure may operate in the total reflective display device.

FIGS. 3A and 3B illustrate schematic structural views of a total reflective display device using the light guide assembly 20 as illustrated in FIG. 2, each figure being illustrated with a portion of light paths in case the a light source 250 is turned on and turned off, respectively. As illustrated in FIGS. 3A and 3B, the light source 250 may be provided on a lateral side of the light guide panel 240 within the light guide assembly 20, such that light rays emitted from the light source 240 may enter the light guide panel 240 from the lateral side thereof.

FIG. 3A illustrates a schematic diagram of operation of the total reflective display device with the light source 250 being turned off. As illustrated in FIG. 3A, in a condition of sufficient ambient light, it is unnecessary to turn on the light source 250. In that condition, the ambient light passes through the light guide panel 240, (the third transparent adhesion layer 230 which may be provided additionally), the second transparent adhesion layer 220 and the first transparent adhesion layer 210 and then irradiates onto the total reflective display assembly 205. As such, the total reflective display assembly 205 may operate properly in a condition of sufficient ambient light.

FIG. 3B illustrates a schematic diagram of operation of the total reflective display device with the light source 250 being turned on. As illustrated in FIG. 3B, in a condition of insufficient ambient light, the light source 250 may for example be turned on. The turn-on and turn-off of the light source 250 may for example be automatic or be triggered manually. By way of example, a luminance of the ambient light therearound may be detected by a luminance transducer/sensor, such that the light source 250 may be turned on automatically in a condition that the luminance as detected is lower than a pre-determined threshold luminance. Again, by way of example, it may be determined whether the light source 250 is to be turned on manually depending on whether the user switches on (e.g., presses/pushes on) a certain button of the total reflective display device. Anyhow, in a condition that the light source 250 is turned on, light emitted therefrom may enter the light guide panel 240 on the lateral side of the light guide panel 240.

In some embodiments, incident light rays may for example have a certain incidence angle range relative to an upper surface and/or lower surface of the light guide panel 240, and the incidence angle range is for example larger than an angle of total reflection of the upper surface, such that a total reflection occurs on the upper surface of the light guide panel 240 (for example, due to the fact that the refractive index of the light guide panel 240 is larger than that of a medium located intermediately thereabove (e.g., air or other transparent medium)), such that the light rays incident on the lateral side of the light guide panel 240 may merely exit from the lower surface of the light guide panel 240. In addition, in some additional or alternative embodiments, no matter whether aforementioned condition(s) concerning the incidence angle range and/or the refractive index may be satisfied, by way of example, any of above profiles may be provided on the upper surface of the light guide panel 240 (by way of example, the profile is in the form of microlenses, mesh grid dot matrix, and the like), so as to change a reflection optical path of light rays emitted from the light source 250 and then incident on the lateral side of the light guide panel 240, on the upper surface of the light guide panel 240, so as to form the effect for example as illustrated in FIG. 3B. In addition, in some embodiments, the light guide panel 240 itself may for example have a mesh grid dot matrix similar to the mesh grid dot matrix 125 as illustrated in FIG. 1, so as to assist the light rays which is incident into the light guide panel 240 from the light source in exiting uniformly from the lower surface of the light guide panel 240. As such, the light rays emitted from the light source 250 may exit from the lower surface of the light guide panel 240 in a manner similar to the ambient light, with the action of the mesh grid dot matrix within the light guide panel 240 (e.g., similar to the mesh grid dot matrix 125 as illustrated in FIG. 1).

In addition, as illustrated in FIG. 3B, when the light rays pass through an interface between the second profile 225 of the second transparent adhesion layer 220 and the first profile 215 of the first transparent adhesion layer 210, they may be refracted at the interface such that the incidence angle thereof relative to the total reflective display assembly 205 decreases (due to a difference in refractive index, and the existence of the first profile as well as the second profile), so as to obtain an even higher amount of light rays reflected at a reflecting layer of the total reflective display assembly 205, and in turn to improve its display quality. As such, the total reflective display assembly 205 may also operate normally and properly in a condition of insufficient ambient light.

FIGS. 4A to 4C illustrate schematically top views of arrangement patterns (in which a plurality of sub-patterns are arranged, respectively) of the first profile 215 and the second profile 225 adopted in light guide assemblies 20 according to different embodiments of the disclosure. Since the first profile 215 and the second profile 225 are provided corresponding to each other, FIGS. 4A to 4C merely illustrate the second profile 225 exemplarily; however, corresponding arrangement pattern of the first profile 215 may be obtained by those skilled in the art depending on the arrangement pattern of the second profile 225. Generally speaking, in order to ensure that the light rays may irradiate more uniformly on the total reflective display assembly 205, in the arrangement pattern(s) of the first profile 215 and/or the second profile 225, a density of the plurality of certain sub-patterns distributed in each arrangement pattern thereof becomes larger as a distance between each of the plurality of sub-patterns and a light incidence side (e.g., the light source 250, or the lateral side of the light guide panel where the light source 250 is located) increases.

By way of example, the second profile 225-1 as illustrated in FIG. 4A may for example have an arrangement pattern in the form of a honeycomb shape, i.e., it may have a honeycomb-shaped pattern. Each of the plurality of certain sub-patterns in the honeycomb-shaped pattern is in a form of round shape, or an approximate circle shape (e.g., an oval shape), with a diameter thereof for example ranging between 10 μm and 30 μm, and a fluctuation level thereof (e.g., level of downward protuberance thereof herein, e.g., referred to as depth) ranging between 3 μm and 10 μm. In addition, as illustrated in FIG. 4A, a density of the plurality of sub-patterns within the arrangement pattern becomes smaller as a distance between each of the plurality of sub-patterns and the light source 250 at the lateral side becomes shorter; and the density of the plurality of sub-patterns within the arrangement pattern becomes larger as the distance between each of the plurality of sub-patterns and the light source 250 becomes longer. By way of example, in a row of the plurality of sub-patterns which are located most closest to the light source 250, the second profile 225-1 has nine round shaped sub-patterns (i.e., a corresponding row of the first profile 215 also has nine round shaped sub-patterns); and in a row of the plurality of sub-patterns which are located most farthest away from the light source 250, the second profile 225-1 has fourteen round shaped sub-patterns (i.e., a corresponding row of the first profile 215 also has fourteen round shaped sub-patterns). Certainly, such an arrangement may merely intend to exemplarily illustrate embodiments of the disclosure, without being limited thereto.

Moreover, the second profile 225-2 as illustrated in FIG. 4B may for example have an arrangement pattern in the form of a matrix pattern comprising a plurality of columns functioning as the plurality of sub-patterns. Each of the plurality of sub-patterns in the matrix pattern comprising a plurality of columns is in a form of rectangular shape, or an approximate rectangle shape (e.g., parallelogram, trapezoid, and the like), with a length thereof for example ranging between 10 μm and 30 μm, a width thereof for example ranging between 3 μm and 5 μm, and a fluctuation level thereof (e.g., level of downward protuberance thereof herein, e.g., referred to as depth) ranging between 3 μm and 10 μm. In addition, as illustrated in FIG. 4B, a density of the plurality of sub-patterns within the arrangement pattern becomes smaller as a distance between each of the plurality of sub-patterns and the light source 250 at the lateral side becomes shorter; and the density of the plurality of sub-patterns within the arrangement pattern becomes larger as the distance between each of the plurality of sub-patterns and the light source 250 becomes longer. By way of example, in a row of the plurality of sub-patterns which are located most closest to the light source 250, the second profile 225-2 has twelve rectangle shaped sub-patterns (i.e., a corresponding row of the first profile 215 also has twelve rectangle shaped sub-patterns); and in a row of the plurality of sub-patterns which are located most farthest away from the light source 250, the second profile 225-2 has fourteen rectangle shaped sub-patterns (i.e., a corresponding row of the first profile 215 also has fourteen rectangle shaped sub-patterns). Certainly, such an arrangement may merely intend to exemplarily illustrate embodiments of the disclosure, without being limited thereto.

Furthermore, the second profile 225-3 as illustrated in FIG. 4C may for example have an arrangement pattern in the form of a herringbone pattern. Each of the plurality of sub-patterns in the herringbone pattern is in a form of rectangular shape, or an approximate rectangle shape (e.g., parallelogram, trapezoid, and the like), with a length thereof for example ranging between 10 μm and 30 μm, a width thereof for example ranging between 3 μm and 5 μm, an inclination angle relative to a lengthwise direction in which the whole light guide assembly extends (i.e., a longitudinal direction, e.g., a left-right direction as illustrated in FIG. 4C) for example ranging between 15° and 60°, and a fluctuation level thereof (e.g., level of downward protuberance thereof herein, e.g., referred to as depth) ranging between 3 μm and 10 μm.

In addition, as illustrated in FIG. 4C, a density of the plurality of sub-patterns within the arrangement pattern becomes smaller as a distance between each of the plurality of sub-patterns and the light source 250 at the lateral side becomes shorter; and the density of the plurality of sub-patterns within the arrangement pattern becomes larger as the distance between each of the plurality of sub-patterns and the light source 250 becomes longer. By way of example, in a row of the plurality of sub-patterns which are located most closest to the light source 250, the second profile 225-3 has twenty-one rectangle shaped sub-patterns (i.e., a corresponding row of the first profile 215 also has twenty-one rectangle shaped sub-patterns); and in a row of the plurality of sub-patterns which are located most farthest away from the light source 250, the second profile 225-3 has twenty-six rectangle shaped sub-patterns (i.e., a corresponding row of the first profile 215 also has twenty-six rectangle shaped sub-patterns). Certainly, such an arrangement may merely intend to exemplarily illustrate embodiments of the disclosure, without being limited thereto.

Certainly, the arrangement pattern(s) of the first profile 215 and/or the second profile 225 which are adapted to embodiments of the disclosure may not be limited to the arrangement patterns and sizes, densities thereof as mentioned above, and above specific designs are merely used as exemplary illustration, rather than restriction. In other words, other proper arrangement patterns having same or similar functionalities may be adopted.

In another aspect of embodiments of the disclosure, a total reflective display device is provided, comprising: the light guide assembly as above; a total reflective display assembly provided on a side of the light guide assembly facing away from a display face; and a light source, which is provided on a lateral side surface of the light guide assembly and configured to emit light incident inwards the light guide panel from a lateral side surface of the light guide panel within the light guide assembly transversely.

Figure 5:
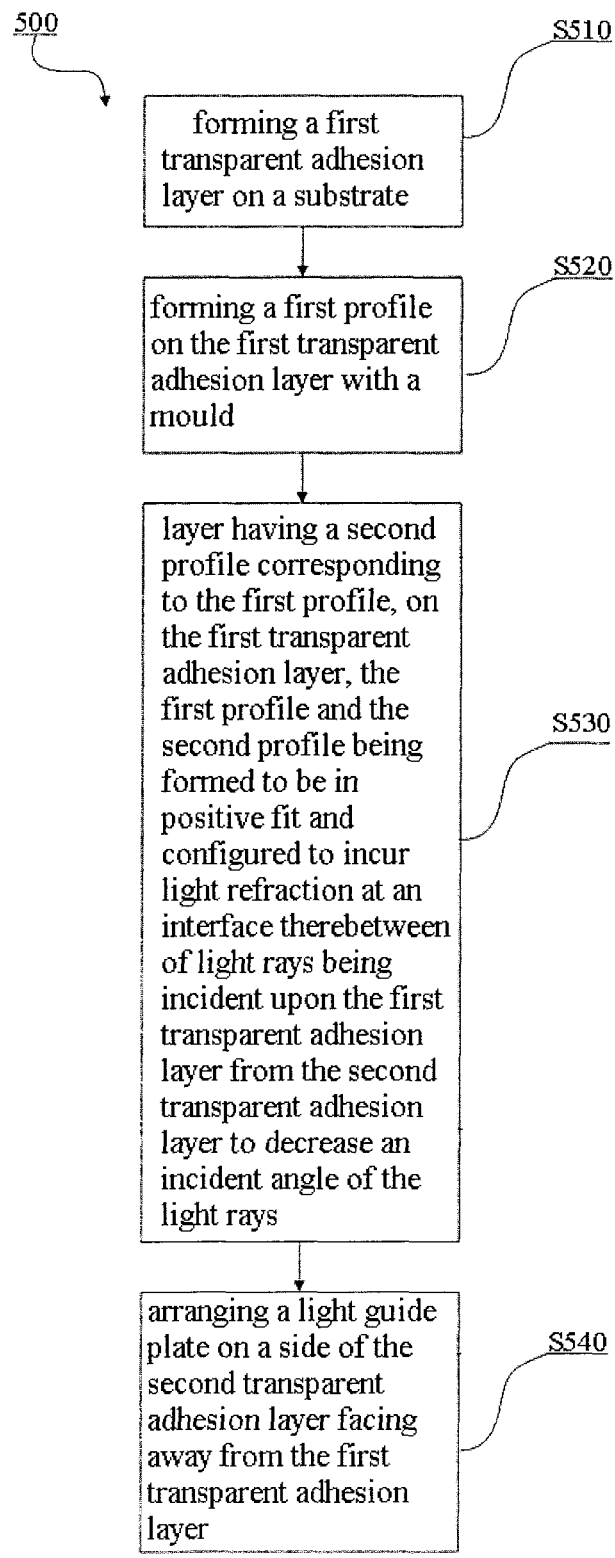
FIG. 5 illustrates a flow chart of an exemplary method for manufacturing a light guide assembly according to an embodiment of the disclosure.

Then, in still another aspect of embodiments of the disclosure, a method for manufacturing a light guide assembly as above according to an embodiment of the disclosure is to be depicted in detail hereinafter in view of FIG. 5. FIG. 5 illustrates a flow chart of an exemplary method 500 for manufacturing a light guide assembly according to an embodiment of the disclosure. As illustrated in FIG. 5, the method 500 comprises four sequential steps S510, S520, S530 and S540. According to some embodiments of the disclosure, several steps of the method 500 may be carried out alone or in combination, and may be carried out in parallel or sequentially, without being limited to a specific operation sequence as illustrated in FIG. 5.

The method 500 starts at the step S510 in which a first transparent adhesion layer 210 is formed on a substrate 200.

Next, in the step S520, a first profile 215 is formed on the first transparent adhesion layer 210 by using a mould 213.

Then, in the step S530, a second transparent adhesion layer 220 having a second profile 225 corresponding to (e.g., shaped to fit with) the first profile 215 is formed on the first transparent adhesion layer 210 having the first profile 215, the first profile 215 and the second profile 225 being formed to be in positive fit with each other and configured to cooperate with each other to incur a light refraction of incident light rays being incident upon the first transparent adhesion layer 210 from the second transparent adhesion layer 220, at an interface between the first transparent adhesion layer 210 and the second transparent adhesion layer 220, so as to decrease an incident angle of the light rays.

Afterwards, in the step S540, a light guide panel 240 is arranged on a side of the second transparent adhesion layer 220 facing away from the first transparent adhesion layer 210.

In some embodiments, the method 500 may for example further comprise an additional step, i.e., forming a third transparent adhesion layer 230 between the second transparent adhesion layer 220 and the light guide panel 240, so as to fix the second transparent adhesion layer 220 relative to the light guide panel 240 more securely, e.g., by adhesion. As such, it may facilitate a perfect adhesion implemented between various transparent adhesion layers and the light guide panel 240, with bubbles being as little as possible or even without any bubble therebetween, so as to improve display quality.

In some embodiments, after the step S540, the method 500 may also for example comprise: removing the substrate 200 from the light guide assembly 20; and adhering the light guide assembly 20 having the substrate 200 removed already to a total reflective display assembly 205 to form a total reflective display device. As such, the total reflective display device having the light guide assembly 20 is manufactured, with an enhanced display quality thereof.

In some embodiments, the method 500 may for example further comprise: providing a light source 250 on a lateral side of the light guide assembly 20, such that light rays emitted by the light source 250 may be incident into the light guide panel 240 from the lateral side of the light guide panel 240 within the light guide assembly 20. As such, in a condition of insufficient ambient light, the light source 250 may be used to enhance display effect.

In some embodiments, after forming one or more of the first transparent adhesion layer 210, the second transparent adhesion layer 220 and the third transparent adhesion layer 230, the method 500 further comprises: pre-curing one or more of the first transparent adhesion layer 210, the second transparent adhesion layer 220 and the third transparent adhesion layer 230, to fix relative positions of these layers. As such, it avoids any misalignment which may occur among these layers in future, and reserves stickiness thereamong so as to facilitate subsequent production steps.

In some embodiments, the step S520 may for example comprise: pressing the first transparent adhesion layer 210 (e.g., pressing an upper surface of the first transparent adhesion layer 210) which has been pre-cured to form the first profile 215 which is recessed inwards the first transparent adhesion layer, on the first transparent adhesion layer 210, by pressing the mould 213 against the first transparent adhesion layer 210 in a direction facing towards the substrate 200. In some embodiments, the step S530 may for example comprise: forming the second transparent adhesion layer 220 having the second profile 225 projecting towards the first profile 215 by applying a liquid transparent adhesive material on a side of the first transparent adhesion layer 210 facing away from the substrate 200 and being formed with the first profile 215 which is recessed inwards the first transparent adhesion layer 210, the second profile 225 being for example in positive fit with the first profile 215. By forming the first profile 215 and the second profile 225, light rays may be refracted at the interface between the first profile 215 and the second profile 225, such that the incidence angle thereof relative to the total reflective display assembly 205 decreases, so as to obtain an even higher amount of light rays reflected at a reflecting layer of the total reflective display assembly 205, and in turn to improve its display quality.

Some specific embodiments of the disclosure are depicted so far. It should be noticed that, various other modification, replacement and addition may be carried out by those skilled in the art without departing from spirits and scope of the embodiments of the disclosure. Therefore, the scope of protection of this disclosure should be defined by accompanying claims, rather than being restricted to aforementioned specific embodiments.

There are several advantageous technical effects brought about by the technical solutions as provided in embodiments of the disclosure, as below:

By using the light guide assembly, the total reflective display device and the method for manufacturing a light guide assembly according to embodiments of the disclosure, light rays emitted from the light source may pass through the light guide panel and at least two (or even three) transparent adhesion layers and then enter the total reflective display assembly, and the at least two transparent adhesion layers have their respective profiles corresponding to (e.g., being in positive fit with) each other at the interface therebetween where the these transparent adhesion layers are in contact with each other. As such, both overall luminance and uniformity of light rays of the total reflective display assembly may be increased, by adjusting shapes and density of the plurality of sub-patterns of the profiles, so as to obtain an effect of enhancing the display quality of the total reflective display device.

Various embodiments of the present disclosure have been illustrated progressively, the same or similar parts of which can be referred to each other or one another. The differences among these various embodiments are described in emphasis.

The light guide assembly, a method for manufacturing the same, and a total reflective display device are illustrated in detail as above in embodiments of the disclosure, by using specific exemplary embodiments to set forth principles and implementations thereof, only intending to assist in understanding the methods and core concept thereof in embodiments of the disclosure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A total reflective display device, comprising:
    a total reflective display assembly;
    a light guide assembly, comprising:
        a first transparent adhesion layer, provided on a side of the total reflective display assembly, with a first profile being formed to be recessed inwards towards a side of the first transparent adhesion layer facing away from the total reflective display assembly;
        a second transparent adhesion layer, which is adhesively provided onto the first profile and is formed with a second profile projecting towards and corresponding to the first profile on a side of the second transparent adhesion layer adhered to the first transparent adhesion layer, the first profile and the second profile being formed to be in positive fit with each other and configured to incur light refraction at an interface therebetween of light rays being incident upon the first transparent adhesion layer from the second transparent adhesion layer to decrease an incident angle of the light rays; and
        a light guide panel, arranged on a side of the second transparent adhesion layer facing away from the first transparent adhesion layer; and
        a light source, which is provided on a lateral side surface of the light guide assembly and configured to emit light inwards the light guide panel within the light guide assembly transversely,
    wherein
    the light guide assembly further comprises: a third transparent adhesion layer, arranged between the second transparent adhesion layer and the light guide panel, and configured to fix the second transparent adhesion layer relative to the light guide panel by adhesion;
    the second transparent adhesion layer comprises: a base layer which is flat and in contact with the light guide panel, and the second profile formed on a side of the base layer facing towards the first transparent adhesion layer; and
    the second profile has a fluctuation level, which is larger than a difference between an overall thickness of both the first transparent adhesion layer and the second transparent adhesion layer and the fluctuation level.

2. The total reflective display device according to claim 1, wherein at least one of the first profile and the second profile has an arrangement pattern in which a plurality of sub-patterns are arranged, comprising one of the following:
    a honeycomb-shaped pattern,
    a matrix pattern comprising a plurality of columns functioning as the plurality of sub-patterns; and
    a herringbone pattern.

3. The total reflective display device according to claim 2, wherein in the arrangement pattern of at least one of the first profile and the second profile, the plurality of sub-patterns are set as following:
    each of the plurality of sub-patterns in the honeycomb-shaped pattern is in a form of round shape, with a diameter ranging between 10 µm and 30 µm, and a fluctuation level ranging between 3 µm and 10 µm.

4. The total reflective display device according to claim 2, wherein in the arrangement pattern of at least one of the first profile and the second profile, the plurality of sub-patterns are set as following:
    each of the plurality of sub-patterns in the matrix pattern comprising a plurality of columns is in a form of rectangular shape, with a length ranging between 10 µm and 30 µm, a width ranging between 3 µm and 5 µm, and a fluctuation level ranging between 3 µm and 10 µm.

5. The total reflective display device according to claim 2, wherein in the arrangement pattern of at least one of the first profile and the second profile, the plurality of sub-patterns are set as following:
    each of the plurality of sub-patterns in the herringbone pattern is in a form of rectangular shape, with a length ranging between 10 µm and 30 µm, a width ranging between 3 μm and 5 μm, an inclination angle relative to a lengthwise direction in which the light guide assembly extends being 15°~60°, and a fluctuation level ranging between 3 μm and 10 μm.

6. The total reflective display device according to claim 1, wherein in the arrangement pattern of at least one of the first profile and the second profile, a density of the plurality of sub-patterns becomes larger as a distance between each of the plurality of sub-patterns and a light incidence side increases.

7. The total reflective display device according to claim 1, wherein a refractive index of the first transparent adhesion layer is smaller than a refractive index of the second transparent adhesion layer.

8. The total reflective display device according to claim 7, wherein the refractive index of the first transparent adhesion layer ranges between 1.4 and 1.54, and the refractive index of the second transparent adhesion layer ranges between 1.58 and 1.8.

9. The total reflective display device according to claim 1, wherein a refractive index of the third transparent adhesion layer ranges between 1.58 and 1.8.

10. A method for manufacturing a light guide assembly, comprising:
    forming a first transparent adhesion layer on a substrate;
    forming a first profile on the first transparent adhesion layer with a mould;
    forming a second transparent adhesion layer being an integral continuous single layer and having a second profile corresponding to the first profile, on the first transparent adhesion layer formed with the first profile, the first profile and the second profile being formed to be in positive fit with each other and configured to incur light refraction at an interface therebetween of light rays being incident upon the first transparent adhesion layer from the second transparent adhesion layer to decrease an incident angle of the light rays; and
    arranging a light guide panel on a side of the second transparent adhesion layer facing away from the first transparent adhesion layer,
    wherein
    the light guide assembly is formed to further comprise: a third transparent adhesion layer, arranged between and being in contact with the second transparent adhesion layer and the light guide panel, and configured to fix the second transparent adhesion layer relative to the light guide panel by adhesion;
    the second transparent adhesion layer is formed to comprise: a base layer which is flat and in contact with the light guide panel, and the second profile on a side of the base layer facing towards the first transparent adhesion layer; and
    the second profile is formed to have a fluctuation level larger than a thickness of the base layer.

11. The method according to claim 10, further comprising:
    forming a third transparent adhesion layer between the second transparent adhesion layer and the light guide panel to fix the second transparent adhesion layer relative to the light guide panel by adhesion.

12. The method according to claim 10, wherein after the step of arranging the light guide panel on the side of the second transparent adhesion layer facing away from the first transparent adhesion layer, the method further comprises:
    removing the substrate from the light guide assembly; and
    adhering the light guide assembly having the substrate removed already to a total reflective display assembly to form a total reflective display device.

13. The method according to claim 11, wherein once one or more of the first transparent adhesion layer, the second transparent adhesion layer and the third transparent adhesion layer are formed, the method further comprises:
    pre-curing one or more of the first transparent adhesion layer, the second transparent adhesion layer and the third transparent adhesion layer, to fix their relative positions thereamong.

14. The method according to claim 13, wherein the step of forming the first profile on the first transparent adhesion layer with a mould comprises:
    pressing the first transparent adhesion layer which has been pre-cured to form the first profile which is recessed inwards the first transparent adhesion layer, on the first transparent adhesion layer, by pressing the mould against the first transparent adhesion layer in a direction facing towards the substrate.

15. The method according to claim 14, wherein the step of forming the second transparent adhesion layer having the second profile corresponding to the first profile on the first transparent adhesion layer formed with the first profile comprises:
    forming the second transparent adhesion layer having the second profile projecting towards the first profile by applying a liquid transparent adhesive material on a side of the first transparent adhesion layer facing away from the substrate and being formed with the first profile which is recessed inwards the first transparent adhesion layer, the second profile being in positive fit with the first profile.

* * * * *